United States Patent
Moussallem et al.

(10) Patent No.: US 10,023,470 B2
(45) Date of Patent: Jul. 17, 2018

(54) PROCESS FOR PREPARING OCTACHLOROTRISILANE AND HIGHER POLYCHLOROSILANES WITH UTILIZATION OF HEXACHLORODISILANE

(71) Applicant: Evonik Degussa GmbH, Essen (DE)

(72) Inventors: Imad Moussallem, Hanau (DE); Juergen Erwin Lang, Karlsruhe (DE); Hartwig Rauleder, Rheinfelden (DE); Martin Trocha, Essen (DE); Nicole Brausch, Essen (DE)

(73) Assignee: EVONIK DEGUSSA GMBH, Essen (DE)

( * ) Notice: Subject to any disclaimer, the term of this patent is extended or adjusted under 35 U.S.C. 154(b) by 148 days.

(21) Appl. No.: 15/138,044

(22) Filed: Apr. 25, 2016

(65) Prior Publication Data

US 2016/0318768 A1 Nov. 3, 2016

(30) Foreign Application Priority Data

Apr. 28, 2015 (EP) .................................... 15165339

(51) Int. Cl.
*C01B 33/107* (2006.01)

(52) U.S. Cl.
CPC ...... *C01B 33/107* (2013.01); *C01B 33/10773* (2013.01)

(58) Field of Classification Search
CPC ............ C01B 33/107; C01B 33/10773; C01B 33/027; C01B 33/10778; C08G 77/60; C09D 183/16; H05H 5/047; Y02P 20/133; C01G 17/04; B01J 19/088; B01J 2219/00853; B01J 2219/0093; B01J 2219/0809; B01J 2219/0815; B01J 2219/083; B01J 2219/0841; B01J 2219/0847; B01J 2219/0849; B01J 2219/0896; B01J 19/12
See application file for complete search history.

(56) References Cited

U.S. PATENT DOCUMENTS

| | | | |
|---|---|---|---|
| 4,542,002 A | 9/1985 | Corma et al. | |
| 2003/0147798 A1 | 8/2003 | Kirii et al. | |
| 2009/0020413 A1* | 1/2009 | Popp .................... | B01J 19/088 204/164 |
| 2009/0169457 A1 | 7/2009 | Auner et al. | |

(Continued)

FOREIGN PATENT DOCUMENTS

| DE | 10 2006 034 061 A1 | 1/2008 |
|---|---|---|
| DE | 10 2007 007 874 A1 | 8/2008 |

(Continued)

OTHER PUBLICATIONS

U.S. Pat. No. 8,722,913, May 13, 2014, US2010080746, Juergen Lang, et al.

(Continued)

*Primary Examiner* — Xiuyu Tai
(74) *Attorney, Agent, or Firm* — Grüneberg and Myers PLLC

(57) ABSTRACT

A controlled preparation of octachlorotrisilane and higher polychlorosilane such as DCTS and DCPS from monomeric chlorosilane, proceeds by exposing the chlorosilane to a nonthermal plasma and recycling chlorosilane that has not been converted to octachlorotrisilane into the plasma.

14 Claims, 1 Drawing Sheet

(56) References Cited

U.S. PATENT DOCUMENTS

| | | |
|---|---|---|
| 2011/0150740 A1 | 6/2011 | Auner et al. |
| 2014/0178284 A1* | 6/2014 | Lang ................. C01B 33/107 423/342 |
| 2014/0193321 A1 | 7/2014 | Lang et al. |
| 2016/0039681 A1 | 2/2016 | Lang et al. |
| 2016/0046494 A1 | 2/2016 | Lang et al. |

FOREIGN PATENT DOCUMENTS

| | | |
|---|---|---|
| DE | 10 2013 207 444 A1 | 10/2014 |
| EP | 1 264 798 A1 | 12/2002 |
| JP | 2008-542162 A | 11/2008 |
| JP | 2009-543828 A | 12/2009 |
| JP | 2011-520762 A | 7/2011 |
| JP | 2011-523926 A | 8/2011 |
| WO | WO 2009/143823 A2 | 12/2009 |
| WO | WO2013/007426 * | 11/2013 |
| WO | WO 2014/173573 A1 | 10/2014 |
| WO | WO 2014/173574 A1 | 10/2014 |

OTHER PUBLICATIONS

U.S. Appl. No. 14/206,554, filed Mar. 12, 2014, US 2014-0193321, Juergen Lang, et al.
U.S. Appl. No. 14/725,131, filed Dec. 20, 2007, US 2015-0258522, Juergen Lang, et al.
U.S. Appl. No. 14/782,247, filed Feb. 28, 2014, US 2016-0046493, Juergen Lang, et al.
U.S. Appl. No. 14/782,099, filed Feb. 28, 2014, US 2016-0039681, Juergen Lang, et al.
U.S. Appl. No. 14/782,470, filed Mar. 4, 2014, US 2016-0046494, Juergen Lang, et al.
U.S. Appl. No. 14/782,545, filed Mar. 4, 2014, US 2016-0046494, Juergen Lang, et al.
Office Action dated May 22, 2017 in Japanese Patent Application No. 2016-091283 (with English language translation).

* cited by examiner

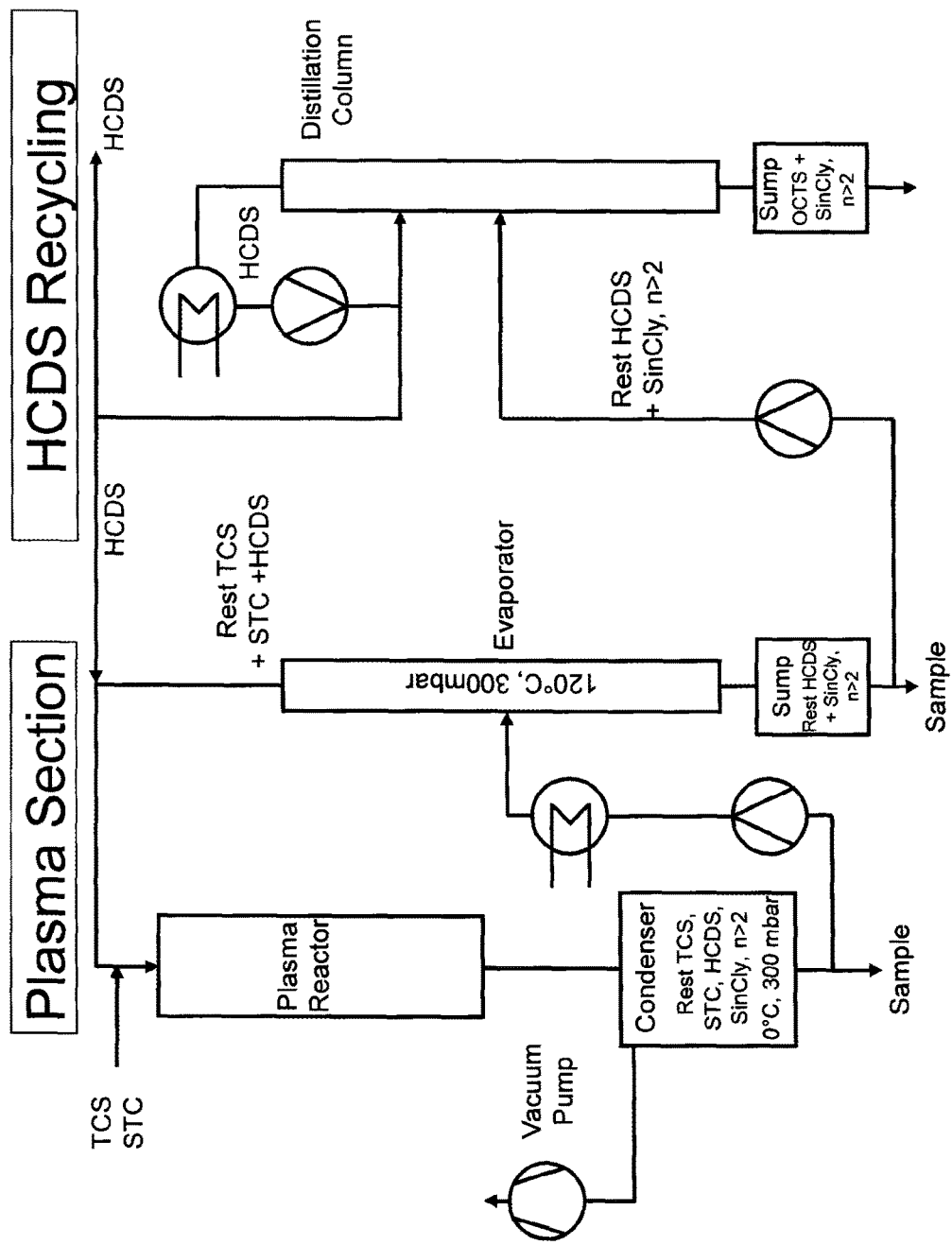

US 10,023,470 B2

PROCESS FOR PREPARING OCTACHLOROTRISILANE AND HIGHER POLYCHLOROSILANES WITH UTILIZATION OF HEXACHLORODISILANE

BACKGROUND OF THE INVENTION

Field of the Invention

The invention relates to a process and an apparatus for preparation of octachlorotrisilane and polychlorosilanes from a monomeric chlorosilane, by exposing the chlorosilane to a nonthermal plasma and recycling chlorosilane that has not been converted to octachlorotrisilane and higher polychlorosilane into the plasma.

Discussion of the Background

The related art discloses processes for preparing polychlorosilanes. For instance, DE 10 2006 034 061 A1 discloses a reaction of silicon tetrachloride with hydrogen to prepare polysilanes. Because of the reaction in the presence of hydrogen, the polysilanes prepared contain hydrogen. In order to be able to keep the plant in continuous operation, tetrachlorosilane is added in excess in relation to the hydrogen. In addition, the plant disclosed has a complex structure and allows only the preparation of polysilane mixtures. An elevated molecular weight of the polysilanes can be achieved only through series connection of a plurality of reactors and high-frequency generators. After passing through each of the series-connected plasma reactors, there is an increase in the molecular weight of the polysilanes after each plasma reactor. The process disclosed is restricted to the preparation of compounds which can be converted to the gas phase without decomposition.

EP 1 264 798 A1 discloses a process for workup of by-products comprising hexachlorodisilane in the preparation of polycrystalline silicon.

U.S. Pat. No. 4,542,002 and WO 2009/143823 A2 also disclose plasmatic processes for preparation of polychlorosilanes proceeding from silicon tetrachloride and hydrogen. As a result of the preparation, hydrogen-containing polychlorosilanes are obtained. According to WO 2009/143823 A2, mixtures of hydrogen-containing high molecular weight polychlorosilanes are obtained. The silicon tetrachloride present in the polychlorosilanes has to be removed by distillation under reduced pressure in a costly and inconvenient manner prior to further use. A particular disadvantage in the prior art is the need to prepare the polychlorosilanes in the presence of gaseous hydrogen. As a result, very high safety demands are placed on the materials and the safeguarding of the plant.

Typically, octachlorotrisilane, abbreviated to "OCTS" in the context of the invention, and higher polychlorosilanes are produced by conducting a gas mixture through a series of plasma reactors. Each pass through one of the plasmas increases the mean molar mass of the gas mixture.

SUMMARY OF THE INVENTION

The problem addressed by the present invention was therefore that of providing a less complex and therefore more economically viable process for preparing high- to ultrahigh-purity octachlorotrisilane, dispensing with the use of hydrogen as process gas.

The present invention relates to a process for preparing octachlorotrisilane, a higher polychlorosilane or a mixture thereof, said process comprising:

a) forming a nonthermal plasma by excitation by an AC voltage of base frequency $f_g$ in a gas which is within a plasma reactor and which comprises $SiCl_4$, $HSiCl_3$, or a mixture of thereof, to obtain a resulting mixture comprising hexachlorodisilane, octachlorotrisilane, a higher polychlorosilane, $SiCl_4$ and $HSiCl_3$, and b) pumping the resulting mixture out of the plasma into a cooler, which is a condenser with a vacuum vessel, and cooling the resulting mixture down to a temperature of not more than 0° C., condensing out the components $SiCl_4$, $HSiCl_3$, hexachlorodisilane, octachlorotrisilane, the higher polychlorosilane or mixtures thereof in the cooler, and c) conducting the components into an evaporator, evaporating the components in the evaporator and then recycling at least a portion of the components into the nonthermal plasma of step a, and at the same time d) collecting the non-recycled higher polychlorosilane and at least a portion each of the hexachlorodisilane and octachlorotrisilane obtained in step b in a collecting vessel, and e) subjecting a bottoms mixture obtained in step d to a distillation, wherein hexachlorodisilane is drawn off and conducted into the nonthermal plasma of step a, and f) collecting the mixture of octachlorotrisilane and higher polychlorosilane which remains after the distillation.

In addition, the presnt invention relates to an apparatus for performance of a process as above; comprising:

the plasma reactor in which a nonthermal plasma is generated, the cooler which is condenser with vacuum vessel, the evaporator, the collecting vessel, and a distillation column, wherein an inlet of the plasma reactor is connected to a recycle line for the $SiCl_4$ and $HSiCl_3$ components and a portion of the higher polychlorosilane, and to a recycle line for the hexachlorodisilane drawn off from the distillation column.

BRIEF DESCRIPTION OF THE DRAWINGS

The FIGURE shows a preparation scheme for OCTS and higher polychlorosilanes.

DETAILED DESCRIPTION OF THE INVENTION

Surprisingly, the level of complexity is reduced by using just one plasma reactor into which a portion of the gas mixture is recycled and converted again.

Any ranges mentioned below include all values and subvalues between the upper and lower limit of the respective range.

In the context of the invention, "polychlorosilanes" are understood to mean those silanes wherein the molecules have at least 2 silicon atoms and more than 2 chlorine atoms, and "higher polychlorosilanes" to mean those silanes wherein the molecules have more than 3 silicon atoms and at least 3 chlorine atoms. Hexachlorodisilane, abbreviated to "HCDS" in the context of the invention, and octachlorotrisilane, abbreviated to "OCTS", are examples of polychlorosilanes. Decachlorotetrasilane, abbreviated to "DCTS", dodecachloropentasilane, abbreviated to "DCPS", and the structural isomers thereof are examples of higher polychlorosilanes.

The invention provides a process for preparing OCTS and/or higher polychlorosilanes, which is characterized in that a) a nonthermal plasma is formed by excitation by means of an AC voltage of base frequency $f_g$ in a gas which is within a plasma reactor and which comprises $SiCl_4$, $HSiCl_3$, or a mixture of these silanes, to obtain a resulting mixture comprising hexachlorodisilane, octachlorotrisilane, higher polychlorosilanes, and the $SiCl_4$ and $HSiCl_3$ components, and b) the resulting mixture is pumped out of the plasma into a cooler (condenser with vacuum vessel) and cooled down to a temperature of not more than 0° C., condensing out the $SiCl_4$, $HSiCl_3$, hexachlorodisilane, octachlorotrisilane and/or higher polychlorosilane components in the cooler, and c) the components are conducted into an evaporator, evaporated in the evaporator and then recycled into the nonthermal plasma of step a, and at the same time d) the non-recycled higher polychlorosilanes and at least a portion each of the hexachlorodisilane and octachlorotrisilane obtained in step b are collected in a collecting vessel, and the bottoms mixture obtained in this step e) is subjected to a distillation, wherein hexachlorodisilane is drawn off and conducted into the nonthermal plasma of step a, and f) the mixture of octachlorotrisilane and higher polychlorosilanes which remains after the distillation is collected.

This process surprisingly converts monomeric chlorosilanes in a nonthermal plasma in a good yield to high- to ultrahigh-purity OCTS and higher polychlorosilane such as DCTS and DCPS.

A particularly great advantage of the process according to the invention is the direct use of the octachlorotrisilane and higher polychlorosilanes prepared, i.e. without further purification, for deposition of high-purity silicon layers having solar silicon purity or semiconductor quality. The octachlorotrisilane prepared in accordance with the invention is preferably, for the purposes of the detection limit customary in the art, free of hydrogen atoms and/or monomeric chlorosilanes and/or polychlorosilanes containing hydrogen atoms. The octachlorotrisilane is regarded as being free of hydrogen when its content of hydrogen atoms is below $1\times10^{-3}\%$ by weight, especially below $1\times10^{-4}\%$ by weight, further preferably below $1\times10^{-6}\%$ by weight down to the detection limit, which is currently $1\times10^{-10}\%$ by weight. The preferred method for determination of the content of hydrogen atoms is $^1$H NMR spectroscopy or CHN analysis, preferably in combination with ICP-MS for determination of the total contamination profile with the elements mentioned further down.

A further advantage of the process is that there is no need to use any hydrogen carrier gas or any additional catalyst. It is thus possible in the process to convert monomeric chlorosilanes or mixtures of monomeric chlorosilanes in the nonthermal plasma to octachlorotrisilane, with no need to add any additional hydrogen-containing compounds, especially hydrogen.

A particular advantage of the process is the possibility of preparation of the product, for example OCTS, DCTS, DCPS, in semiconductor quality proceeding from ultrahigh-purity tetrachlorosilane ($STC_{eg}$), preferably in a mixture having a content of ultrahigh-purity trichlorosilane ($TCS_{eg}$).

The process is elucidated in detail below.

The mixture that results after step a comprises hexachlorodisilane, octachlorotrisilane and/or higher polychlorosilanes. It may also comprise HCl. The resulting mixture is condensed in step b in the condensate vessel (condenser). The condensate vessel is connected to a vacuum pump, which helps to adjust the absolute pressure in the plasma reactor.

In the condensation, HCl gas is separated off in one stage, and it is possible to use the HCl gas to entrain traces of $SiHCl_3$, $SiCl_4$. The amount of entrained TCS and STC is dependent on the temperature to which cooling is effected in step b, and on the absolute pressure generated by the vacuum pump. After step b, the condensate mixture comprising the condensed $SiCl_4$, $HSiCl_3$, HCDS, OCTS and higher polychlorosilane components is conducted, preferably pumped, into the evaporator.

It may be advantageous to meter these components in liquid form from the condenser into the evaporator. Such a metering operation can produce a falling film, by means of which the evaporation is achieved. According to the temperature set for the evaporation and the absolute pressure which is set in the evaporator, there is a change in the proportion of HCDS and OCTS in the stream which is conducted into the plasma reactor.

Preferably, the maximum possible amount of $SiCl_4$, $HSiCl_3$ and HCDS is evaporated therein and recycled into the nonthermal plasma. Further preferably, the condensate mixture is brought to the evaporation temperature of HCDS at the appropriate operating pressure. This means that, for example, at a temperature of 100° C., this pressure is at least 300 mbar abs, in order to evaporate the entire unconverted amount of TCS and STC and the maximum possible amount of HCDS. The vapours from the evaporator are recycled into the nonthermal plasma of step a.

The evaporator is preferably executed as a one-stage evaporation tube, for example as a heating tube, short-path evaporator or thin-film evaporator.

In the process according to the invention, the temperature of the vapours may be set within the range from −60° C. to 200° C., more preferably from 80° C. to 120° C.

Preferably, the temperatures set in the plasma reactor and in the evaporator in step c may be the same. More preferably, the temperatures set in the plasma reactor and in the evaporator are each the same, within a range from 80° C. to 120° C. at 300 $mbar_{abs}$. Very particular preference is given to the range from 100° C. to 120° C. Within this selection range for the temperatures set equally, the proportion of HCDS which is circulated in the process is surprisingly high. This non-linear behaviour is shown by Table 1.

In principle, the components of the resulting mixture in step b are recycled in condensed form, and the vapours of TCS, STC, HCDS and higher polychlorosilanes obtained after the evaporation are recycled in gaseous form to the plasma reactor inlet.

It has been found that, in the process of the invention, preferably in step c, the $SiCl_4$, $HSiCl_3$ and higher polychlorosilane components can be metered in in liquid form. However, the components metered in, especially the higher polychlorosilanes, have to be evaporated in order to be gaseous before they pass into the plasma reactor. This makes it advantageous to meter them into the evaporator, which may preferably be executed as a falling-film evaporator unit.

In step a, a nonthermal plasma is used. The nonthermal plasma is generated in a plasma reactor in which a plasmatic conversion of matter is induced, which is based on anisothermal plasmas. For these plasmas, a high electron temperature $T_e \geq 10^4$ K and relatively low gas temperature $T_G \leq 10^3$ K are characteristic. The activation energy needed for the chemical processes is predominantly effected via electron impacts, and these processes are what is meant by the "plasmatic conversion of matter". Typical nonthermal plasmas can be generated, for example, by glow discharge, HF discharge, hollow cathode discharge or corona discharge. For a definition of nonthermal plasma and of homogeneous plasma catalysis, reference is made to the relevant technical literature, for example to "Plasmatechnik: Grundlagen and Anwendungen—Eine Einführung [Plasma Technology: Fundamentals and Applications—An Introduction]; collective of authors, Carl Hanser Verlag, Munich/Vienna; 1984, ISBN 3-446-13627-4".

In steps c and e of the invention, hexachlorodisilane is recycled into the plasma reaction. This increases the yield of high- or ultrahigh-purity OCTS and higher polychlorosilanes. Ultrahigh-purity chlorosilane, especially ultrahigh-purity OCTS, contains a total contamination with the elements below of less than or equal to 50 ppm by weight to 0.001 ppt by weight, preference being given to less than or equal to 40 ppm by weight to 0.001 ppt by weight:

A. aluminium from 15 ppm by weight to 0.0001 ppt by weight, and/or
B. boron less than or equal to 5 to 0.0001 ppt by weight, preferably in the range from 3 ppm by weight to 0.0001 ppt by weight, and/or
C. calcium less than or equal to 2 ppm by weight, preferably from 2 ppm by weight to 0.0001 ppt by weight, and/or
D. iron from 5 ppm by weight to 0.0001 ppt by weight, preferably from 0.6 ppm by weight to 0.0001 ppt by weight, and/or
E. nickel from 5 ppm by weight to 0.0001 ppt by weight, preferably from 0.5 ppm by weight to 0.0001 ppt by weight, and/or
F. phosphorus from 5 ppm by weight to 0.0001 ppt by weight, preferably from 3 ppm by weight to 0.0001 ppt by weight, and/or
G. titanium less than or equal to 10 ppm by weight, less than or equal to 2 ppm by weight, preferably from 1 ppm by weight to 0.0001 ppt by weight, further preferably from 0.6 ppm by weight to 0.0001 ppt by weight, further preferably from 0.1 ppm by weight to 0.0001 ppt by weight, and/or
H. zinc less than or equal to 3 ppm by weight, preferably from 1 ppm by weight to 0.0001 ppt by weight, further preferably from 0.3 ppm by weight to 0.0001 ppt by weight, and/or
I. carbon, where the target concentration of carbon is at a detection limit customary in the context of the measurement method known to a person skilled in the art.

The total contamination with the aforementioned elements is preferably determined by means of ICP-MS. Overall, the process can be monitored continuously by means of online analysis. The required purity can be checked by means of GC, IR, NMR, ICP-MS, or by resistance measurement or GD-MS after deposition of the Si.

It is likewise advantageous that it is possible to dispense with the use of costly, inert noble gases. Alternatively, it is possible to add an entraining gas, preferably a pressurized inert gas, such as nitrogen, argon, another noble gas or mixtures thereof. The gas may thus comprise at least one further gas selected from noble gas and nitrogen, preferably nitrogen.

A further advantage of the process is the selective preparation of ultrahigh-purity octachlorotrisilane which may have a low content of ultrahigh-purity hexachlorodisilane, ultrahigh-purity decachlorotetrasilanes and/or dodecachloropentasilane and meets the demands of the semiconductor industry in an excellent manner.

The selectivity of the process of the invention for the production of OCTS can be improved further by the options which follow.

It is possible to inject at least one electromagnetic pulse with repetition rate g into the nonthermal plasma which is formed in step a by excitation by means of an AC voltage of base frequency $f_g$, said pulse having a voltage component having an edge slope in the rising edge of 10 V ns$^{-1}$ to 1 kV ns$^{-1}$, and a pulsewidth b of 500 ns to 100 µs.

The working pressure at which the plasma treatment of the invention is conducted is between 1 and 10 000 mbar$_{abs}$, preferably 100 to 800 mbar$_{abs}$. The gas mixture used is preferably brought to a temperature of −40° C. to 200° C., more preferably to 20 to 120° C., most preferably to 100 to 120° C.

Paschen's law states that the starting voltage for the plasma discharge is essentially a function of the product, p·d, of the pressure of the gas, p, and the electrode distance, d. For the process according to the invention, this product is in the range from 0.001 to 300 mm·bar, preferably from 0.01 to 100 mm·bar, particularly preferably 0.05 to 10 mm·bar, in particular 0.07 to 2 mm·bar. The discharge can be induced by means of various AC voltages and/or pulsed voltages from 1 to 1000 kV. The magnitude of the voltage depends, in a manner known to the person skilled in the art, not only on the p·d value of the discharge arrangement but also on the process gas itself. Particularly suitable are those pulsed voltages which permit high edge slopes and a simultaneous formation of the discharge within the entire discharge space of the reactor.

The distribution over time of the AC voltage and/or of the electromagnetic pulses injected can be rectangular, trapezoidal, pulsed or composed in sections of individual time distributions. AC voltage and electromagnetic pulses injected can be combined in each of these forms of the time distribution.

The base frequency $f_g$ of the AC voltage in the process according to the invention may be within a range from 1 Hz to 100 GHz, preferably from 1 Hz to 100 MHz. The repetition rate g of the electromagnetic pulses superimposed on this base frequency may be selected within a range from 0.1 Hz to 50 MHz, preferably from 50 kHz to 50 MHz. The amplitude of these pulses may be selected from 1 to 15 kV$_{pp}$ (kV peak to peak), preferably from 1 to 10 kV$_{pp}$, more preferably from 1 to 8 kV$_{pp}$.

These pulses can have all shapes known to the person skilled in the art, e.g. sine, rectangle, triangle, or a combination thereof. Particularly preferred shapes are rectangle or triangle.

A further increase in the selectivity of the process according to the invention for OCTS and higher polychlorosilanes can be achieved when the electromagnetic pulse injected into the plasma is superimposed with at least one further electromagnetic pulse with the same repetition rate, or the two or at least two pulses are in a duty ratio of 1 to 1000 relative to one another. Preferably, both pulses are selected with a rectangular shape, in each case with a duty ratio of 10 and a very high edge slope. The greater the edge slope, the higher the yield. The amplitude selected for these pulses may be from 1 to 15 kV$_{pp}$, preferably from 1 to 10 kV$_{pp}$.

The selectivity increases with the repetition rate. This may be, for example, 10 times the base frequency $f_g$.

In the process of the invention, the electromagnetic pulse or pulses can be injected by means of a pulse ballast with current or voltage impression. If the pulse is current-impressed, a greater edge slope is obtained.

In a further embodiment of the process according to the invention, the pulse can also be injected in a transient asynchronous manner known to the person skilled in the art instead of a periodic synchronous manner.

In a further embodiment of the process according to the invention, the reactor may be equipped with tubular dielectric material in order to prevent nonuniform fields in the reaction chamber and hence uncontrolled conversion. Preferably, the ratio of reactor tube diameter to its length is 300 mm/700 mm with 50 tubes. With further preference, the reactor with the low-capacitance dielectric material forms one unit with the ballast of high-resistance, broadband design.

In the process of the invention, within the reactor, it is possible to use tubes which are mounted and held apart by spacers made from inert material. Such spacers are used to balance out manufacturing tolerances of the tubes, and at the same time to minimize their mobility in the reactor.

It may likewise be advantageous to use spacers made of a low-κ material in the process of the invention. Particularly preferred is the use of Teflon, which is known to the person skilled in the art.

It may additionally be advantageous, in step b of the process, to set the pressure in the vacuum vessel to 1 $mbar_{abs}$ to 1000 $mbar_{abs}$. Low pressures have the advantage that the nonthermal plasma forms fewer filaments, such that the plasma is more homogeneous. The more homogeneous the plasma, the fewer silicon solids are produced in the process. No solids or a particularly low silicon solids content is obtained at pressures of 1 to 600 $mbar_{abs}$.

It may additionally be advantageous to set the temperature in step b within the range from −60° C. to 0° C. Preferably, in step b of the process, the entire resulting mixture from the plasma reactor is condensed. This gas mixture should be cooled to its condensation temperature. For example, the boiling temperature of trichlorosilane (TCS) at 300 $mbar_{abs}$ is 0° C. Therefore, the temperature in the condensate vessel is cooled to 0° C. or lower.

In steps c and e of the invention, hexachlorodisilane, within measurement uncertainties that are customary in the art, is recycled preferably completely into the plasma reaction, in order thus to increase the yield of OCTS and higher polychlorosilanes still further.

The invention likewise provides an apparatus or a plant for performance of the process according to the invention. One embodiment of the apparatus is shown in schematic form in the Figure. The cooler, in a manner known per se to those skilled in the art, is executed as a condenser with vacuum vessel.

The plasma reactor in which a nonthermal plasma is generated has a dedicated cooler (condenser with vacuum vessel), evaporator and distillation column. The evaporator is connected to a collecting vessel (sump). The bottoms mixture obtained in step d of the process according to the invention and collected in the collecting vessel is subjected to a distillation in the distillation column. The inlet of the plasma reactor is connected to the recycle line for the $SiCl_4$ and $HSiCl_3$ components and a portion of the higher polychlorosilanes, and with the recycle line for the hexachlorodisilane drawn off from the distillation column.

Having generally described this invention, a further understanding can be obtained by reference to certain specific examples which are provided herein for purposes of illustration only, and are not intended to be limiting unless otherwise specified.

EXAMPLES

Example

Influence of Temperature in the Plasma Reactor and Evaporator on the Amounts of HCDS, OCTS and Higher Polychlorosilanes Recycled In a 15-tube plasma reactor, a gas containing $SiCl_4$ and $HSiCl_3$ was used to form a nonthermal plasma by excitation by means of a WEDECO EFFIZON® generator (ozone generator of the SWO-GSO series) with an AC voltage of base frequency $f_g$ 927 Hz, measured with the Agilent DSO1022A digital oscilloscope and PMK PHV4002-3 high-voltage probe. A mixture of hexachlorodisilane, octachlorotrisilane, higher polychlorosilanes and the silanes used at the outset was obtained. This mixture was pumped from the plasma into a cooler and cooled to a temperature of 0° C., condensing $SiCl_4$, $SiHCl_3$, hexachlorodisilane, octachlorotrisilane and higher polychlorosilanes in the cooler. A portion of the mixture was recycled via an evaporator into the nonthermal plasma. The remaining portion of the non-recycled higher polychlorosilanes and a portion of the hexachlorodisilane and octachlorotrisilane were collected in a collecting vessel. The bottoms mixture thus obtained was distilled, drawing off hexachlorodisilane and recycling it into the nonthermal plasma. The mixture that remained after distillation contained octachlorotrisilane and higher polychlorosilanes and was collected in a collecting vessel.

The pressure in the vacuum vessel was 300 $mbar_{abs}$.

In the context of the invention, figures having the unit "g/m²h" mean the mass of silane or silanes produced per hour and square metre of surface area of the electrodes producing the nonthermal plasma.

Table 1 shows the masses of silanes having two (Si=2), three (Si=3), four (Si=4) and five (Si=5) silicon atoms, measured during the conduction of the process according to the invention, as a function of the temperature set in the evaporator in ° C. The amount was weighed and the proportions were reconciled by gas chromatography. Additionally recorded is the sum total of the masses of silanes having more than two silicon atoms (ΣSi>2).

TABLE 1

| Evaporator & plasma reactor Temperature/ | Concentration in the circuit/% by wt. | | Production/g/m²h | | | | | Vapours Temperature/ |
|---|---|---|---|---|---|---|---|---|
| ° C. at 300 $mbar_{abs}$ | HCDS | OCTS | HCDS | OCTS | Si = 4 | Si = 5 | ΣSi > 2 | ° C. |
| 60 | <0.5 | <0.1 | 183 | 84 | 25 | 3 | 112 | 30 |
| 80 | <0.5 | <0.1 | 190 | 97 | 43 | 13 | 153 | 30 |
| 100 | <0.5 | <0.1 | 181 | 96 | 42 | 15 | 152 | 30 |
| 120 | ~6 | ~1 | 95 | 91 | 95 | 44 | 230 | 80 |

TABLE 1-continued

| Evaporator & plasma reactor Temperature/ °C. at 300 mbar$_{abs}$ | Concentration in the circuit/% by wt. | | Production/g/m²h | | | | | Vapours Temperature/ °C. |
|---|---|---|---|---|---|---|---|---|
| | HCDS | OCTS | HCDS | OCTS | Si = 4 | Si = 5 | ΣSi > 2 | |
| 140 | >6 | ~2 | 101 | 49 | 69 | 53 | 172 | 105 |
| 160 | >6 | ~2 | 108 | 47 | 25 | 30 | 102 | 130 |

Example a

Preparation of HCDS and OCTS with High Yields

In the evaporator and in the plasma reactor, the temperature was set to 80° C.

The following silane concentrations were found in the circulation stream:

Silanes with Si=2: below 0.5% by weight, and with Si=3: below 0.1% by weight.

Si=2: 190 g/m²h
Si=3: 97 g/m²h
Si=4: 43 g/m²h
Si=5: 13 g/m²h

Example b

Preparation of OCTS and DCTS with High Yields

As in example a, except that the temperature in the evaporator and in the plasma reactor was set to 120° C. The following silane concentrations were found in the circulation stream:

Silanes with Si=2: about 6% by weight, and with Si=3: about 1% by weight.

Si=2: 95 g/m²h
Si=3: 91 g/m²h
Si=4: 95 g/m²h
Si=5: 44 g/m²h

In the comparison at different temperatures, it was found that, in the case of an increase in the temperature set equally in the plasma reactor and in the evaporator from 60 to 120° C., the masses of silanes having more than two silicon atoms (ΣSi>2) produced rose from 112 to 226 g/m²h, while the mass of HCDS simultaneously fell from 182 to 54 g/m²h.

It was also found that, in the range of temperatures of about 100° C. to 140° C., in the circulation stream of HCDS which had been formed by the HCDS produced and recycled, the percentage by mass of circulating HCDS had risen to 6% by weight—compared with the range at temperatures of 60° C. to 100° C., in which this proportion was below 0.5% by weight.

In addition, it was observed that changes in the pressure affected the residence time in the plasma, the homogeneity of the plasma and the temperatures required in the evaporator. Without being bound to a particular theory, the inventors assume that:

(1) The velocity distribution in the gas and the residence time in the plasma reactor change with the pressure. Higher pressures cause higher residence times in the plasma zone. This increases the production or selectivity of higher polychlorosilanes.

(2) On the other hand, the plasma forms more filaments at higher pressure. This results in formation of more silicon solids.

(3) At higher pressure, a higher temperature has to be set in the evaporator, in order to circulate the amount of HCDS produced, which could lead to thermal stress and breakdown of the higher polychlorosilane.

European patent application EP15165339 filed Apr. 28, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A process for preparing octachlorotrisilane, a higher polychlorosilane, or a mixture thereof, said process comprising:
   a) forming a nonthermal plasma by excitation by an AC voltage of base frequency $f_g$ in a gas which is within a plasma reactor and which consists of $SiCl_4$, $HSiCl_3$, or a mixture thereof, and optionally at least one inert gas, to obtain a resulting mixture comprising hexachlorodisilane, ortachlorotrisitane, a higher polychlorosilane, $SiCl_4$ and $HSiCl_3$, and
   b) pumping the resulting mixture out of the plasma reactor into a cooler, which is a condenser with a vacuum vessel, and
   cooling the resulting mixture down to a temperature of not more than 0° C., condensing out the components $SiCl_4$, $HSiCl_3$, hexachlorodisilane, octachlorotrisilane, the higher polychlorosilane or mixtures thereof in the cooler, and
   c) conducting the components into an evaporator, evaporating the components in the evaporator and then recycling at least a portion of the components into the nonthermal plasma of step a, and at the same time
   d) collecting the non-recycled higher polychlorosilane and
   at least a portion each of the hexachlorodisilane and octachlorotfisilane obtained in step b a collecting vessel, and
   e) subjecting the bottoms mixture obtained in step d to a distillation, wherein hexachlorodisilane is drawn off and conducted into the nonthermal plasma of step a, and
   f) collecting the mixture of octachlorotrisilane and higher polychlorosilane which remains after the distillation.

2. The process according to claim 1, wherein the temperature in the gas is set within the range from −60° C. to 200'C.

3. The process according to claim 1, wherein the temperatures set in the plasma reactor and in the evaporator in step c are the same.

4. The process according to claim 1, wherein, in step a, at least one electromagnetic pulse with repetition rate g injected into the plasma has a voltage component having an edge slope in the rising edge of 10 V ns$^{-1}$ to 1 kV ns$^{-1}$, and has a pulse width b of 500 ns to 100 μs.

5. The process according to claim 4, wherein
the base frequency $f_g$ of the AC voltage is from 1 Hz to 100 MHz,
the repetition rate g is from 0.1 Hz to 50 MHz, and
the amplitude is from 1 to 15 kV$_{pp}$.

6. The process according to claim 4, wherein the electromagnetic pulse injected into the plasma is superimposed with at least one further electromagnetic pulse with the same repetition rate, and the two or at least two' pulses are in a duty ratio of 1 to 1000 relative to one another.

7. The process according to claim 4, wherein at least one electromagnetic pulse is injected by a pulse ballast with current or voltage impression.

8. The process according to Claim 1, wherein the pressure in the vacuum vessel in step b is set to at least one value in the range from 1 to 10,000 mbar$_{abs}$.

9. The process according to Claim 1, wherein the temperature in step b is in the range from −60° C.

10. The process according to claim 1, wherein the at least one inert gas is present in the plasma reactor, and wherein the at least one inert gas is at least one gas selected from the group consisting of a noble gas, nitrogen, and mixtures thereof.

11. An apparatus for performance of the process according to claim 1, the apparatus comprising:
the plasma reactor suitable for generating a nonthemial plasma,
the cooler which is the condenser with the vacuum vessel,
the evaporator,
the collecting vessel, and
a distillation column,
wherein
an inlet of the plasma reactor is connected to a recycle line for the SiCl$_4$ and HSiCl$_3$ components and a portion of the higher polychlorosilane, and to a recycle line for the hexachlorodisilane drawn off from the distillation column.

12. The process of claim 1, wherein the mixture of actachlorotrisilane and the at least one higher polychlorosilane k substantially free of hydrogen atoms.

13. The process of claim 1, wherein the octachlorotrisilane is substantially free of monomeric chlorosilanes.

14. ; The process of claim 1, wherein the oetachlorotrisilane is substantially free of polymeric chlorosilanes containing hydrogen atoms.

* * * * *

UNITED STATES PATENT AND TRADEMARK OFFICE
CERTIFICATE OF CORRECTION

PATENT NO. : 10,023,470 B2
APPLICATION NO. : 15/138044
DATED : July 17, 2018
INVENTOR(S) : Imad Moussallem et al.

It is certified that error appears in the above-identified patent and that said Letters Patent is hereby corrected as shown below:

On the Title Page

In the second page, under OTHER PUBLICATIONS, the fourth listing is currently:
"U.S. Appln. No.14/782,099, filed Feb. 28, 2014, US 2016-0039681, Juergen Lang, et al."
And should be:
--U.S. Appln. No. 14/782,099, filed Feb. 28, 2014, US 2016-0030911, Juergen Lang, et al.--

In the second page, under OTHER PUBLICATIONS, the fifth listing is currently:
"U.S. Appln. No.14/782,470, filed Mar. 4, 2014, US 2016-0046494, Juergen Lang, et al."
And should be:
--U.S. Appln. No. 14/782,470, filed Mar. 4, 2014, US 2016-0039681, Juergen Lang, et al.--

Signed and Sealed this
Twelfth Day of February, 2019

Andrei Iancu
*Director of the United States Patent and Trademark Office*